United States Patent Office 3,358,023
Patented Dec. 12, 1967

3,358,023
DEHALOGENATION PROCESS TO PRODUCE 2-MONO-HALO-ACETOACETAMIDES
James S. Birtwistle, White Plains, N.Y., and Elliot Bergman, Modesto, Calif., assignors to Shell Oil Company, New York, N.Y., a corporation of Delaware
No Drawing. Filed Oct. 1, 1965, Ser. No. 492,295
9 Claims. (Cl. 260—561)

This invention relates to a process for preparing 2-monohaloacetoacetamides by the selective removal of one halogen atom of the corresponding 2,2-dihaloacetoacetamides.

The dialkyl 2-carbamoylvinyl phosphates of U.S. Patent 2,802,855 form an important class of insecticides. As indicated in the patent, such phosphates ordinarily are prepared by reacting the appropriate trialkyl phosphite with the appropriate 2-haloacetoacetamide. If the corresponding 2,2-dihaloacetoacetamide is present, it also reacts, resulting in the corresponding dialkyl 2-halo-2-carbamoylvinyl phosphate. The presence of this latter compound in the product is undesirable, since it combines the undesirable properties of reduced insecticidal activity and increased mammalian toxicity, compared to the desired non-halogenated phosphate. It therefore is highly desirable that the 2-haloacetoacetamide be as free as possible from the corresponding 2,2-dihaloacetoacetamide.

Commercially, the 2-haloacetoacetamides have customarily been prepared by halogenation of the corresponding acetoacetamides. In practice, it has been found to be very difficult to avoid formation of the corresponding 2,2-dihaloacetoacetamides. In fact, where the starting material is a N-monoalkylacetoacetamide, it has been found to be virtually impossible to avoid formation of substantial amounts of the 2,2-dihalo-N-alkylacetoacetamide. Further, it has been found that selective removal of the dihalo compound by physical methods is very difficult and expensive, since the physical properties of the dihalo compound are very similar to those of the monohalo compound. While processes for improving the selectivity of the halogenation of the acetoacetamide have been developed, even in the most effective processes some of the dihalo contaminant is formed, and in the case of the N-monoalkylacetoacetamides, a substantial amount of the dihalo contaminant is formed even in the most efficient halogenation practice. There is, thus, a real need for some method for preparing 2-monohaloacetoacetamides that contain less of the corresponding 2,2-dihaloacetoacetamides than has heretofore been possible without recourse to difficult and expensive physical processes for removing the dihalo contaminants from the corresponding monohalo products.

Such a process now has been discovered. It is based upon the discovery that if a 2,2-dihaloacetoacetamide is subjected to the action of one of certain cations of transition metals in liquid phase comprising a protonic liquid, one of the halogen atoms of the acetoacetamide is removed and replaced by hydrogen from the liquid, without affecting the other halogen atom of the acetoacetamide. When a 2,2-dihaloacetoacetamide is treated in this manner, it is converted to the 2-monohaloacetoacetamide as essentially the only product. The reaction has been found to be highly selective.

The reaction is believed to proceed according to the following equation:

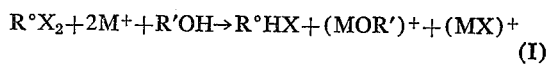

$$R°X_2 + 2M^+ + R'OH \rightarrow R°HX + (MOR')^+ + (MX)^+ \quad (I)$$

wherein $R°X_2$ is the dihaloacetoacetamide, $R°HX$ is the monohaloacetoacetamide, M is a transition metal capable of forming the monovalent cation $M^+$ and the divalent cation $M^{++}$, $R'OH$ is the protonic liquid, $R'$ being hydrogen or organic and X represents halogen.

It has been further found that this selective removal of one of the halogen atoms of the dihaloacetoacetamide can be effected from the outset in the presence of the corresponding monohaloacetoacetamide. This discovery permits the up-grading of a crude product of the halogenation of an acetoacetamide, containing both mono- and dihaloacetoacetamide, directly, without the necessity for first separating the two amides.

Also, it has been found that this selective dehalogenation can be conducted in the presence of substantial amounts of a water-immiscible liquid such as a halogenated alkane. Since the halogenation of acetoacetamides ordinarily is conducted in the presence of such liquids—for example, methylene chloride—this additional discovery permits conduct of the dehalogenation without removal of the water-immiscible liquid used in the halogenation, if such be present.

Further, it has also been found that the desired reaction proceeds under a wide range of pH conditions, and in particular proceeds under acidic conditions. Since the crude final reaction mixture from the halogenation of the acetoacetamide ordinarily is acid (containing the hydrohalic acid corresponding to the halogen), this discovery permits the application of the process of this invention to the crude final reaction mixture from the halogenation of the acetoacetamide without neutralization of its acidity.

These discoveries provide the process of this invention, which generically stated comprises bringing together in liquid phase a 2,2-dihaloacetoacetamide, a protonic liquid and a cation of one of certain transition metals.

An essential feature of this process is the cation used. This must be the cation of one of certain transition metals that are capable of forming cations of different valency, the cation used in the process of the invention being one in which the metal is in a lower valence state—that is, the cation must not be one in which the metal is in the highest valence state in which it is capable of existing.

Such cations have been found to react substantially as indicated in Equation I, the cation being converted (oxidized) to a cation of the transition metal of higher valency; this cation will be referred to hereinafter as the oxidized cation. To be brief, yet to clearly distinguish the two kinds of cations involved, the cation of lower valency, used at the outset in the process of the invention, will be referred to hereinafter as the reduced cation.

Another essential feature of the process is the use of a protonic liquid, since this furnishes the hydrogen to replace the halogen removed from the 2,2-dihaloacetoacetamide. The protonic liquids are considered for the purposes of this invention to be those liquids which release protons and thus provide hydrogen to replace the halogen removed from the dihaloacetoacetamide. In the process of the invention, a primary member of this class of liquids is water, while primary subclasses are the alcohols and carboxylic acids, of these latter subclasses, the alkanols and alkanemonocarboxylic acids are of most interest in the process of the invention.

According to conventional practice, the 2-haloacetoacetamide product would be separated from the final crude product, and if it were intended to reuse the transition metal cation and/or to use the remaining protonic liquid, the oxidized cation (more properly, the salt of which it is a part) and/or the liquid would be recovered, the cation reduced to its original valency by conventional means, and the resulting reduced cation and/or liquid employed for producing further 2-haloacetoacetamide.

However, it has been found that the oxidized cation can be converted to the reduced cation in situ—in the presence of both the mono- and dihaloacetoacetamides—without interference with or adverse effect upon the desired reaction by means of reducing agents for the oxidized cation.

Further, it has been discovered that by including such a reducing agent in the reaction mixture, the amount of reduced cation that is required can be very materially reduced from the amount that stoichiometrically would be required to convert all of the dihaloacetoacetamide. Apparently, the reducing agent regenerates reduced cation from the oxidized cation as it is formed, and the regenerated reduced cation converts further dihaloacetoacetamide. When the process is carried out in this way, the amount of reduced cation approaches that amount ordinarily associated with the use of a catalyst. When the process is carried out employing the reduced amount of cation, and the reducing agent is used, the cation will be referred to as a catalyst, the amount used as a catalytic amount and the reaction referred to as the catalytic reaction. It has been found that in the absence of the cation, the reducing agent being supplied, the desired reaction does not proceed at a significant rate, if at all. It also has been found that from the overall standpoint, the cation may be considered to remain in the system unchanged—the cation being in the reduced form in the final product, and the cation being only transitorily in the higher valency state during the reaction. On the other hand, when the oxidized cation is not reduced in situ, and there is used at least the amount of reduced cation required to theoretically react with all of the dihaloacetoacetamide, the reduced cation will be referred to as a reactant, the amount thereof as the theoretical or stoichiometric amount, and the reaction referred to as the stoichiometric reaction.

The discovery that the oxidized cation can be reduced in situ, with consequent use of a catalytic amount of the cation, permits the use of an often operationally very advantageous and often substantially less expensive, subgeneric aspect of the process of the invention, wherein a minor amount of the reduced cation is mixed with the dihaloacetoacetamide, the protonic liquid and the reducing agent. This aspect of the invention can often be advantageous operationally because with proper choice, the reducing agent can be one that results in a by-product more easily separated from the final reaction mixture than is the salt of the oxidized cation, and it can avoid the otherwise necessary discard of the oxidized cation or reduction of the oxidized cation in a separate zone—thus materially reducing the process equipment that is required.

Accordingly, a preferred aspect of the process of this invention comprises mixing a 2,2-dihaloacetoacetamide (which may be admixed with the corresponding 2-haloacetoacetamide) with a minor amount of a reduced cation of a transition metal as has been defined hereinbefore, a protonic liquid and a reducing agent of the character defined hereinbefore.

The 2,2- dihaloalkanoylacetamides contemplated as starting materials in the process of this invention may be characterized by the following formula:

$$R-\overset{R}{\underset{R}{C}}-\overset{O}{\overset{\|}{C}}-\overset{X}{\underset{X}{C}}-\overset{O}{\overset{\|}{C}}-N\diagup\overset{R}{\diagdown R}$$

wherein each R is hydrogen or lower alkyl of 1 to 4 carbon atoms, and each X is a middle halogen—that is, chlorine or bromine.

The process of the invention appears to be unique to dicarbonylic amides having the structure:

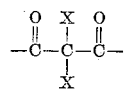

directly connected to the amido nitrogen atom. A particular benefit of the process is the fact that the attack on the first carbon-halogen bond proceeds without appreciable attack either on the second carbon-halogen bond or on any other possible reactive bonds of the molecule, such as those of the adjacent nitrogen atom.

Both substituted and unsubstituted dihaloalkanoylacetamides are effectively converted to the corresponding monohalo compounds by the process of the invention. Examples having no substituents on the nitrogen atom include:

2,2-dichlorobutyroacetamide
2,2-dibromovaleroacetamide
2-chloro-2-bromoacetoacetamide
2,2-dichloroisobutyroacetamide
2,2-dichloroacetoacetamide Examples wherein two alkyl groups of 1 to 4 carbon atoms are bonded to the nitrogen include:

2,2-dichloro-N,N-dimethylacetoacetamide
2,2-dibromo-N,N-diethylpropioacetamide
2-chloro-2-bromo-N,N-dimethylacetoacetamide
2,2-dichloro-N-methyl-N-ethylacetoacetamide
2,2-dichloro-N,N-dibutylvaleroacetamide
2,2-dichloro-N,N-diisopropylacetoacetamide As has already been pointed out, the process of the invention is particularly applicable to the preparation of 2-halo-N-alkylalkanoyl-acetamides from 2,2-dihalo-alkyl-alkanoylacetamides, because of the substantial amounts of the latter that are invariably formed when an N-alkyl-acetoacetamide is halogenated. These 2,2-dihalo-N-alkyl-alkanoylacetamides have the generic formula:

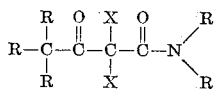 (II)

wherein each R and X have the respective meanings already given and $R_1$ is alkyl of 1 to 4 carbon atoms. Typical compounds of this class include:

2,2-dichloro-N-methylbutyroacetamide
2,2-dibromo-N-ethylvaleroacetamide
2-chloro-2-bromo-N-methylacetoacetamide
2,2-dichloro-N-isopropyl-sec-butyroacetamide
2,2-dichloro-N-butylacetoacetamide
2,2-dibromo-N-isobutylacetoacetamide
2,2-dichloro-N-sec-butylacetoacetamide
2,2-dichloro-N-methylacetoacetamide Of this subclass, the most important are 2,2-dichloroacetoacetamides wherein all of the R substituents are hydrogen and $R_1$ is an alkyl group attached to the amido nitrogen atom. These otherwise unsubstituted 2,2-dichloro-N-alkylacetoacetamides have the general formula:

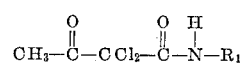

For the sake of brevity, the process of the invention will be described in terms of the most preferred member of that class, 2,2-dichloro-N-methylacetoacetamide.

As has already been mentioned, the reduced cation must be a cation of lower valency of a transition metal capable of forming cations of different valency. In addition, it is highly desirable that the halide salts of both the cation of lower valency (reduced cation) and the cation of higher valency (oxidized cation) be at least somewhat soluble in the protonic liquid. For the sake of convenience, these metals, which can form cations of different valence, will be referred to as polyvalent metals; as used herein, this term does not define only metals which can form cations having a valence greater than one (although such metals are included within the meaning of the term) but defines metals that are capable of forming cations of different valency. As used herein, copper is a polyvalent metal, since it can form the cuprous ion ($Cu^+$) and the cupric ion ($Cu^{++}$). Metals which are suitable include vanadium, chromium, manganese, iron, titanium, tin, mercury, cobalt and copper. Corresponding reduced cations include $V^{++}$, $Cr^{++}$, $Mn^{++}$, $Fe^{++}$, $Ti^{++}$, $Ti^{+++}$, Sn++, Hg+, Co++ and Cu+. While any of the salts of these cations that are soluble to some extent in water and/or other protonic liquids are suitable, the halide salts are preferred to reduce the number of anions in the reaction mixture, it being still more preferred, for the same reason, that the halogen of the cation salt be the same as the halogen of the 2,2-dihaloacetoacetamide reactant. The copper salts are most preferred because of the high activity of cuprous ion in the process of the invention and because suitable copper salts are readily available commercially. When the process of the invention is carried out stoichiometrically, the reduced cation must be used. When the process of the invention is carried out catalytically, either the reduced cation or oxidized cation can be used, the oxidized cation being reduced in situ by the reducing agent.

Water is the preferred protonic liquid, because it donates hydrogen readily, the reduced cations are highly active in its presence, and its physical properties—particularly its solvent properties with respect to the halide salts of the contemplated transition metal cations—are appropriate for its use as a liquid reaction medium as well as a reactant. Other suitable protonic liquids include alcohols and carboxylic acids. Of these, the alkanols and alkanemonocarboxylic acids of up to six carbon atoms, typical members of this class including methanol, ethanol, n- and isopropyl alcohols, the various isomeric butyl, amyl and hexyl alcohols, acetic acid, propionic acid, butyric acid and the like are preferred. Mixtures of these liquids also are suitable, and may be preferable in particular cases. Choice of the particular protonic liquid or liquids in any particular case will depend to a large extent on solubility relationships, taking into account the particular dichloroacetoacetamide to be reacted and the particular salt of the transition metal cation to be used. In general it appears preferable that even when one or more of the other protonic liquids is to be used, water be included in the reaction mixture. The respective amounts of the liquid(s) used should be chosen to provide optimum solvent capacity for the dihaloacetoacetamide reactant and the salt of the transition metal that is used, particularly for the latter. In most cases, it will be found desirable that the liquid reaction medium be at least fifty percent water. Where water is present, and another protonic liquid also is used, it will be found desirable that the liquid be miscible with water to a substantial extent, preferably completely miscible. It is permissible, however, and in some cases even desirable, to include in the reaction mixture a substantial amount of an essentially water-immiscible inert liquid, such as a chlorinated alkane. Examples: methylene chloride, carbon tetrachloride, chloroform, and the like. This liquid may be included to effect selective removal of the monohaloacetoacetamide product from the aqueous phase of the reaction mixture.

Where a reducing agent is employed to regenerate reduced cation from oxidized cation in situ in the reaction mixture, the agent must of course be one that will effect the regeneration, and it must also be one that does not cause or promote any undesirable side reactions. In each case the material chosen to regenerate the reduced cation must be one involving an oxidation-reduction couple potential that is more positive than the oxidation-reduction couple potential of the reduced cation. That is to say, in a table of standard oxidation-reduction potentials, such as appears in the several editions of the "Reference Book of Inorganic Chemistry," Latimer and Hildebrand, and in other authorities, the couple involved in oxidation-reduction of the suitable reducing agent must appear above the couple involved in oxidation-reduction of the regeneration of the reduced cation. Also, because the different dihaloacetoacetamides differ somewhat in their sensitivity to the reagents involved, the choice of reducing agent will depend to a significant extent upon the particular dihaloacetoacetamide to be treated. Examples of reducing agents that may be used with the class of dihaloacetoacetamides and transition metal cations include sulfite ion, bisulfite ion, thiosulfite ion, sulfide ion, and such metals as the alkali metals, alkaline earth metals, tin, zinc and magnesium. The sulfite, bisulfite and thiosulfate ions can be provided by the corresponding alkali metal and alkaline earth metal salts; sulfite and bisulfite ions can also be provided by sulfur dioxide. Sulfide ion is best provided by hydrogen sulfide. Preferred because they are highly effective and are soluble in the preferred aqueous reaction mixtures, and the alkali metal bisulfites, particularly sodium and potassium bisulfites, sulfur dioxide and hydrogen sulfide.

The amount of the transition metal cation that must be supplied will depend upon whether the process of the invention is carried out stoichiometrically or catalytically. As indicated in Equation I, theoretically two equivalents of the cation must be supplied per mole of dihaloacetoacetamide to be treated; consequently, in stoichiometric operation, at least two equivalents of cation must be supplied per mole of the dihaloacetoacetamide.

To insure complete reaction, it generally will be found desirable to apply a moderate excess of the cation over the theoretical amount. In general, an excess of at least 100% should be supplied, and in most cases, a two- to four-fold excess will be desirable. In most cases, more than six-fold excess will not be desirable, since it will not lead to better results than are obtainable with lesser excess, and the greater amount of cation will unduly further complicate recovery of the desired product.

When the process is carried out catalytically, the amount of cation supplied suitably amounts to from about 0.005 equivalent to about 0.5 equivalent per mole of the dihaloacetoacetamide. Generally, best results are attained from the use of from about 0.02 to about 0.15 equivalent of cation per mole of dihaloacetoacetamide.

Whether the process of the invention is carried out stoichiometrically or catalytically the protonic liquid acts as a reagent, and consequently at least the amount theoretically required to supply enough hydrogen to replace the halogen removed from the dihaloacetoacetamide must be provided. From Equation I, it will be seen that this requires at least one equivalent of protonic liquid per mole of dihaloacetoacetamide treated—a total of one mole of water, alkanol and/or alkanemonocarboxylic acid per mole of dihaloacetoacetamide. Again, it is desirable to supply an excess, since this will not adversely affect the reaction and will insure completion of the reaction; further, the protonic liquid can also be used as a liquid reaction medium in almost all cases, to advantage. At least a two-fold, and preferably three- or four-fold, or even larger, excess is employed. The maximum amount is established in most cases only by the diminution of reaction rate that results from undue dilution of the reactants.

When used, the reducing agent also acts, effectively, as a reagent. For example, where bisulfite ion is used as the reducing agent, the reaction can be written

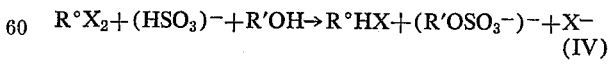

$$R°X_2 + (HSO_3)^- + R'OH \rightarrow R°HX + (R'OSO_3^-)^- + X^-$$
(IV)

wherein the symbols, R°, R' and X, have the respective meanings set out in Equation I. Consequently, at least one equivalent of reducing agent must be supplied for each mole of dihaloacetoacetamide. One way, and in many cases the most convenient way, of conducting the process of the invention is to mix the dihaloacetoacetamide, transition metal salt and protonic liquid, and then add the reducing agent, the extent and to a large extent the rate of the reaction being controlled by the rate at which the reducing agent is added. In such case, the reaction may be conducted much like a titration, the reducing agent being added until the desired reaction is complete—in such cases, little or no excess of reducing agent is required. However, even in such cases, and in general where other techniques for conducting the reaction are used, a slight to moderate excess—for example, a 25% to 100% excess—of the reducing agent may be advantageous to insure completion of the desired reaction. More than 200% excess will be found undesirable in most cases, since such a large excess will not be needed, and will unduly complicate recovery of the desired product.

In some—probably very few—cases, it may be found desirable to conduct the process stoichiometrically, at least to some extent, then to reduce the oxidized cation. The principles set out above will indicate how this can be accomplished—the primary factors being use of the appropriate amounts of transition metal cation and reducing agent, and the times at which they are employed, relative to the extent of the dehalogenation reaction.

The process of the invention generally is best carried out at temperatures slightly to moderately above room temperature—for example, at temperatures of from about 30° C. to about 100° C. Usually, it will be found best to maintain the reaction temperature within the range 35° C. to 85° C., temperatures at the lower part of this range being more suitable when the reaction is carried out stoichiometrically. The process can be carried out at atmospheric pressure, or at elevated pressure, as in the case where sulfur dioxide or other gaseous reducing agent is employed. The process can be carried out in a batch, semi-batch, or continuous manner. The reactants (and catalyst if used) can be added in any desired order, although as has already been mentioned, when the process is carried out catalytically, it may be found preferable to mix the dihaloacetoacetamide, catalyst and protonic liquid, and then add the reducing agent.

When conversion of the dihaloacetoacetamide to the desired monohaloacetoacetamide has taken place to the degree required, the product monohaloacetoacetamide may be separated from the reaction system in any of a variety of conventional methods known to the art. Such methods include fractional distillation, solvent extraction, crystallization, and the like. Since the product is organic, it is quite convenient to extract it from the aqueous system by extraction with a water-immiscible liquid in which the monohaloacetoacetamide is soluble. Suitable extractants include chloroform, carbon tetrachloride, methylene chloride and the like. If desired, several successive extractions may be used to achieve the desired degree of separation. In some cases, it may be found desirable and convenient to include such a water-immiscible liquid in the reaction mixture, to effect separation of the monohaloacetoacetamide as formed, from the aqueous portion of the reaction mixture.

To illustrate the process of the invention, the following examples are set forth. It should be understood, however, that these examples are merely illustrative and are not to be regarded as limitations to the appended claims, since the basic teachings thereof may be varied at will as will be understood by one skilled in the art. In the examples, the proportions are expressed in parts by weight unless otherwise noted.

*Example I*

A solution of ten percent by weight 2,2-dichloro-N-methylacetoacetamide in one normal hydrochloric acid was mixed with sufficient of a solution of cuprous chloride slurried in a small amount of one normal hydrochloric acid to provide 6 moles of cuprous chloride per mole of the acetoacetamide, and the mixture warmed to 55° C. and held at that temperature for 30 minutes. Substantially quantitative conversion of the 2,2-dichloro-N-methylacetoacetamide to 2-chloro-N-methylacetoacetamide was obtained.

The experiment was repeated, employing 2-chloro-N-methylacetoacetamide as the initial reactant. Essentially no conversion of the 2-chloro-N-methylacetoacetamide to the unchlorinated N-methylacetoacetamide, or any other product, was found.

In this work, the solution was acidified to simulate the acid product that might be obtained from chlorination of the N-methylacetoacetamide.

*Example II*

A mixture of 2,2-dichloro- and 2-chloro-N-methylacetoacetamides obtained by chlorination of N-methylacetoacetamide was treated according to the catalytic aspect of the process of the invention. The mixture, containing 5.2 percent N-methylacetoacetamide, 76.7 percent 2-chloro-N-methylacetoacetamide and 18.1 percent 2,2-dichloro-N-methylacetoacetamide (percents are by weight), was slurried with cuprous chloride (ten percent by weight of the 2,2-dichloro-N-methylacetoacetamide), and the mixture heated to 85° C. 7.5 percent by weight aqueous sodium bisulfite solution was added as rapidly as possible while maintaining the temperature of the mixture at 85° C. The residence time in the reactor and the mole ratio of sodium bisulfite-to-dichloroacetoacetamide was controlled by varying the flow rate of the bisulfite solution. The product was worked up by extracting the final mixture several times with methylene chloride, then removing the methylene chloride by vacuum distillation to 70° C. and 10 Torr. for 20 minutes. The residue was analyzed by gas-liquid chromatography, nuclear magnetic resonance and wet analysis. The results of representative experiments are given in Table I.

Substitution of cupric sulfate for cuprous chloride as the catalyst produced no apparent difference in results.

TABLE I

| | Run 1 | Run 2 | Run 3 | Run 4 |
|---|---|---|---|---|
| Mole ratio: NaHSO₃/2,2-dichloro-N-methylacetoacetamide | 2.03 | 0.96 | 1.67 | 1.08 |
| Residence time (minutes) | 10 | 15 | 15 | 15 |
| Reaction temperature (° C.) | 83 | 84–87 | 84–86 | 85–90 |
| Analysis of reaction product (percent by weight): | | | | |
| 2-chloro-N-methylacetoacetamide | 92.2 | 92.4 | 92.9 | 91.5 |
| 2,2-dichloro-N-methylacetoacetamide | 4.2 | 3.5 | 4.3 | 3.9 |
| N-methylacetoacetamide | 3.2 | 3.5 | 2.5 | 3.5 |
| 2,2-dichloro-N-methylacetamide | 0.4 | 0.3 | 0.3 | 0.7 |

*Example III*

Employing the technique described in Example II, 2,2-dichloro-N-methylacetoacetamide was dechlorinated to 2-chloro-N-methylacetoacetamide, cuprous chloride being used as catalyst, sodium bisulfite being used as reducing agent and water being the protonic liquid. The acetoacetamide was mixed with water at the outset to provide 0.95 mole of the acetoacetamide per liter of water. The results are given in Table II.

TABLE II

| Reaction Temperature, ° C. | Reaction Time, hours | Dichloro-Compound in Product, percent W. | Monochloro-Compound in Product, percent W. | Unchlorinated Compound in Product, percent |
|---|---|---|---|---|
| 85 | ½ | 35 | 65 | 0 |
| 85 | 1 | 26 | 74 | <1 |
| 85 | 2 | 18.2 | 82 | 0 |
| 85 | ᵃ 2 | 14.4 | 85 | 0.6 |
| 85 | 3 | 7.5 | 92 | 0.6 |
| 85 | ᵇ 1 | 23.8 | 75 | 1.2 |

ᵃ The product was isolated by continuous extraction and 20% excess sodium bisulfite was used.
ᵇ The sodium bisulfite solution was added dropwise over 1 hour.

*Example IV*

Employing the technique described in Example III, a chlorination product of N-methylacetoacetamide containing 15% by weight of 2,2-dichloro- and 85% by weight of 2-monochloro-N-methylacetoacetamide, was dechlorinated using cuprous chloride as catalyst and sodium bisulfite as reducing agent. The original mixture was at the outset mixed with sufficient water to provide the 2,2- dichloro-N-methylacetoacetamide concentration indicated in Table III, in which the results are described.

TABLE III

| Reaction Temperature, °C | Reaction Time, hours | Concentration of Dichloro-Compound moles/liter of Water | Dichloro-Compound in Product, Percent w. | Monochloro-Compound in Product, Percent w. | Unchlorinated Compound in Product, Percent w. |
|---|---|---|---|---|---|
| 85 | a 2½ | 0.31 | 2 | 97 | 1 |
| 85 | b 2½ | 0.92 | <1 | 98 | 2 | a The sodium bisulfite was added dropwise over 1 hour.
b The sodium bisulfite was added dropwise over 1½ hours.

*Example V*

Employing the technique of Example III, and employing essentially pure 2,2-dichloro-N-methylacetoacetamide, and vanadous chloride and chromous chloride as catalysts, sodium bisulfite as reducing agent and water as the protonic liquid, the results set out in Table IV were obtained. Reaction temperature was 85° C., the amount of catalyst was 10 percent by weight of the dichloroacetoacetamide.

TABLE IV

| Catalyst | Reaction Time, hours | Dichloro-Compound in Product, Mole Percent | Monochloro-Compound in Product, Mole Percent |
|---|---|---|---|
| Vanadous chloride | 2 | 63 | 37 |
| Chromous chloride | 1 | 80 | 20 |

*Example VI*

When the following are reacted by a method substantially similar to that described in Example III, the following products are obtained.

| Starting 2,2-dihalo Compound | Reducing Agent | Catalyst | Product |
|---|---|---|---|
| $CH_3\overset{O}{\underset{\|}{C}}CCl_2\overset{O}{\underset{\|}{C}}NH_2$ | Sodium metabisulfite | Cupric chloride | $CH_3\overset{O}{\underset{\|}{C}}CHCl\overset{O}{\underset{\|}{C}}NH_2$ |
| $CH_3\overset{O}{\underset{\|}{C}}CCl_2\overset{O}{\underset{\|}{C}}NHC_2H_5$ | do | Copper sulfate | $CH_3\overset{O}{\underset{\|}{C}}CHCl\overset{O}{\underset{\|}{C}}NHC_2H_5$ |
| $CH_3\overset{O}{\underset{\|}{C}}CCl_2\overset{O}{\underset{\|}{C}}NHC_4H_9$ | do | Cupric chloride | $CH_3\overset{O}{\underset{\|}{C}}CHCl\overset{O}{\underset{\|}{C}}NHC_4H_9$ |
| $CH_3\overset{O}{\underset{\|}{C}}Cl_2\overset{O}{\underset{\|}{C}}N(CH_3)_2$ | Sodium bisulfite | Copper sulfate | $CH_3\overset{O}{\underset{\|}{C}}CHCl\overset{O}{\underset{\|}{C}}N(CH_3)_2$ |
| $CH_3\overset{O}{\underset{\|}{C}}Cl_2\overset{O}{\underset{\|}{C}}N(C_2H_5)_2$ | Sodium thiosulfate | Cupric chloride | $CH_3\overset{O}{\underset{\|}{C}}CHCl\overset{O}{\underset{\|}{C}}N(C_2H_5)_2$ |

*Example VII*

Since chlorination of acetoacetamides ordinarily is carried out in the presence of a halogenated alkane such as methylene chloride, an experiment was performed to ascertain if the presence of such a material would have any adverse effect upon the dehalogenation reaction. N-methylacetoacetamide was chlorinated in a mixture of methylene chloride and water. After chlorination was complete, cuprous chloride slurry was added to the crude product, at room temperature, and the reactor closed for pressure operation. The mixture was heated to 85° C. in 25 minutes to give a reactor pressure of 65 p.s.i.g. Aqueous sodium bisulfite was pumped into the reactor over a period of 30 minutes. The mixture was held at 80–85° C. for an additional 2 hours, then cooled to room temperature, phase separated and the aqueous phase extracted four times with methylene chloride, ratio of one volume methylene chloride for each two volumes of aqueous phase. The aqueous phase and solid from the methylene chloride phase were analyzed. The original charge contained 868 parts of N-methylacetoacetamide, 457 parts of water and 6807 parts of methylene chloride. 10 parts of cuprous chloride in 252 parts of water and 113 parts of sodium bisulfite in 841 parts of water were used.
Product Analyses:
  Aqueous phase (4220 parts):
    N-methylacetoacetamide; 0.41% by weight
    2-chloro-N-methylacetoacetamide; 0.81% by weight
  Solid phase (1165 parts):
    N-methylacetoacetamide; 1% by weight
    2-chloro-N-methylacetoacetamide; 94% by weight
    2,2-dichloro-N-methylacetoacetamide; 5% by weight.
Yield of 2-chloro-N-methylacetoacetamide based on N-methylacetoacetamide charged: 90%.

*Example VIII*

The procedure of Example VII was duplicated, except that sulfur dioxide (70 parts) was substituted for the sodium bisulfite. Injection of the sulfur dioxide into the reactor required 15 minutes. The original charge contained 975 parts of N-methylacetoacetamide, 457 parts of water and 6807 parts of methylene chloride. 10 parts of cuprous chloride in 252 parts of water and 113 parts of sodium bisulfite in 841 parts of water were used.
Product Analyses:
  Aqueous phase (3380 parts):
    N-methylacetoacetamide; 1.4% by weight
    2-chloro-N-methylacetoacetamide; 0.33% by weight
  Solid phase (1149 parts):
    N-methylacetoacetamide; 1% by weight
    2-chloro-N-methylacetoacetamide; 95% by weight
    2,2-dichloro-N-methylacetoacetamide; 4% by weight
Yield of 2-chloro-N-methylacetoacetamide based on N-methylacetoacetamide charged: 87%.

We claim as our invention:
1. A process for converting a 2,2-dihaloalkanoylacetamide to the corresponding 2-haloalkanoylacetamide, which comprises reacting an amide having the structural formula

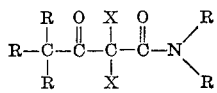

wherein each R is hydrogen or alkyl of 1 to 4 carbon atoms and each X is selected from the group consisting of chlorine and bromine with a halide salt of a metal selected from the group consisting of multi-valent transition metals, copper, mercury, and tin, wherein the metal cation is not in its highest valence state, in a liquid solvent which is at least one member of the group consisting of water, alkanols of up to six carbon atoms and alkanemonocarboxylic acid of up to six carbon atoms.

2. A process according to claim 1 wherein the dihaloalkanoylacetamide is of the group consisting of N-unsubstituted 2,2-dihaloacetoacetamides, 2,2-dihalo-N-alkylacetoacetamides, and 2,2-dihalo-N,N-dialkylacetoacetamides, and wherein the cation is cuprous cation.

3. A process according to claim 1 wherein the 2,2-dihaloalkanoylacetamide is 2,2,-dichloro-N-methylacetoacetamide, and wherein the cation is cuprous cation.

4. A process according to claim 3 wherein the liquid solvent is water.

5. A process for converting a 2,2-dihaloalkanoylacetamide to the corresponding 2-haloalkanoylacetamide, which comprises reacting an amide having the structural formula

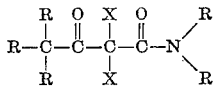

wherein each R is hydrogen or alkyl of 1 to 4 carbon atoms and each X is selected from the group consisting of chlorine and bromine, with a salt selected from the group consisting of copper sulfate, and the halide salts of multi-valent transition metals, copper, mercury, and tin,
wherein the metal cation is not in its highest valence state, in a liquid solvent which is at least one member of the group consisting of water, alkanols of up to six carbon atoms and alkanemonocarboxylic acid of up to six carbon atoms, and
in the presence of a reducing agent for the metal cation in a higher valence state wherein the reducing agent is a member of the group consisting of tin, zinc, magnesium, sulfur dioxide, hydrogen sulfide, and alkali metal salts and alkaline earth metal salts of sulfite anion, bisulfite anion, and thiosulfate anion.

6. A process according to claim 5 wherein the 2,2-dihaloalkanoylacetamide is selected from the group consisting of N-unsubstituted 2,2-dihaloacetoacetamides, 2,2-dihalo-N-alkylacetoacetamides, and 2,2-dihalo-N,N-dialkylacetamides;
wherein the cation is cuprous cation; and
wherein the reducing agent is a member of the group consisting of sodium bisulfite, potassium bisulfite, sulfur dioxide, and hydrogen sulfide.

7. A process according to claim 6 wherein the 2,2-dihaloalkanoylacetamide is 2,2-dichloro-N-methylacetoacetamide, and
wherein the cation is cuprous cation.

8. A process according to claim 7 wherein the liquid solvent is essentially water, and wherein the reducing agent is sodium bisulfite.

9. A process according to claim 7 wherein the liquid solvent is essentially water, and wherein the reducing agent is sulfur dioxide.

References Cited
UNITED STATES PATENTS 3,133,965    5/1964    Amann et al. _____ 260—561

ALEX MAZEL, *Primary Examiner.*

J. A. NARCAVAGE, *Assistant Examiner.*